(12) United States Patent
Pramod et al.

(10) Patent No.: US 10,411,634 B2
(45) Date of Patent: Sep. 10, 2019

(54) CONTROLLER ANTI-WINDUP FOR PERMANENT MAGNET SYNCHRONOUS MACHINES

(71) Applicant: STEERING SOLUTIONS IP HOLDING CORPORATION, Saginaw, MI (US)

(72) Inventors: Prerit Pramod, Saginaw, MI (US); Zhe Zhang, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 15/824,482

(22) Filed: Nov. 28, 2017

(65) Prior Publication Data
US 2019/0165712 A1    May 30, 2019

(51) Int. Cl.
*H02P 3/18*    (2006.01)
*H02P 23/00*    (2016.01)
*B62D 5/04*    (2006.01)

(52) U.S. Cl.
CPC .......... *H02P 23/0004* (2013.01); *B62D 5/046* (2013.01); *H02P 2205/07* (2013.01)

(58) Field of Classification Search
CPC .. B62D 5/046; H02P 23/0004; H02P 2205/07
See application file for complete search history.

(56) References Cited

U.S. PATENT DOCUMENTS

2011/0309781 A1* 12/2011 Tomigashi .............. H02P 21/13
                                                                    318/504
2014/0334204 A1* 11/2014 Hamada ................ H02P 27/085
                                                                    363/71

* cited by examiner

*Primary Examiner* — Muhammad S Islam

(57) ABSTRACT

Technical solutions are described for preventing controller windup in a motor control system. An example system includes a first anti-windup module that receives a commanded voltage and a limited voltage command. The limited voltage command is applied to an electric motor, where the first anti-windup module generates a first modified current command by modifying a current command that is applied to the motor control system. The modification is based on a ratio of the commanded voltage and the limited voltage command. The system further includes a second anti-windup module that receives the commanded voltage and the limited voltage command. The second anti-windup module generates a second modified current command by modifying the first modified current command. The modification based on a difference between the commanded voltage and the limited voltage command.

20 Claims, 10 Drawing Sheets

DIRECTION-PRESERVING VOLTAGE LIMITER

CONTROLLER ANTI-WINDUP FOR PERMANENT MAGNET SYNCHRONOUS MACHINES

BACKGROUND

The present application generally relates to motor control systems, and particularly to preventing windup in motor control systems, and more particularly to those used in systems like electric power steering (EPS) systems.

EPS systems typically use an electric drive to provide steering assist torque to a driver. Typically, torque control of an electric drive system that uses a Permanent Magnet Synchronous Machines (PMSMs) is performed indirectly by regulating the current. In general, the current control of machine currents is performed using a feedback control architecture with measured currents in the synchronously rotating reference frame utilizing Field Oriented Control (FOC) techniques, such as feedback control closed-loop. Feedback control in general has good steady-state tracking performance, dynamic response, high bandwidth and satisfactory disturbance rejection. As a result, feedback current control is typically used to control multi-phase AC machines, such as the PMSMs.

Closed-loop current control of electric motors in EPS systems has demanding requirements outside of the control system's capability to track the desired assist torque command (e.g. motor torque command). Among these, consistency of performance throughout the operating range of the control system is required, including operation throughout the motor velocity range and operation approaching the supply voltage limit.

Using feedback control in EPS systems has several unique and demanding requirements, including satisfactory performance in a broad speed range and operation near or at the supply voltage limit. Unlike other motor control systems, such as those in high power applications, DC bus voltage in EPS systems is supplied by a vehicle battery and is usually relatively low (typically less than 20V). In addition, the motor in an EPS system is typically sized as efficiently as possible to deliver steady state power requirements. Therefore, EPS motors frequently operate near or at the voltage limit. Further, for closed-loop current feedback motor control architectures, the control system is designed to track current step commands with near-zero steady state error. Two integrators, one for each current loop, may be utilized for this purpose. The current controller applies a suitable transformation on the reference and measured currents, in order to obtain voltage commands, which are then applied to the motor via a voltage source inverter (VSI).

Some current control systems are designed as quasi-linear feedback architectures expected to satisfy a given set of linear system performance metrics. However, non-linear constraints associated with the actuator can cause the linear feedback control loop to destabilize when the actuator limits are reached, resulting in degraded overall system performance. This degraded performance can manifest itself both in terms of tracking behavior, torque ripple and audible noise. One such nonlinearity in the motor control system is that the total voltage applied to the motor is limited by the amount of voltage available at the input of the VSI. If the linear control loop computes voltage commands that result in an overall voltage command magnitude that is beyond the output of the battery, the voltage commands may need to be limited.

An issue that arises due to the presence of such a plant input saturation nonlinearity is that when the controller computes voltage commands (transient or steady-state) beyond the voltage limit of the system, the voltage commands are limited to the maximum available battery voltage and the states (or element of the controller that has memory), such as that of an integrator, become incorrect, because they do not conform to the non-limited or pre-limited voltage commands computed originally. If the saturated condition lasts for a long period of time, the states of the controller may become highly incorrect. When the system returns to the linear operating range, the states can return to correct values after a certain amount of time, which is dependent on how long the saturation condition lasted as well as the post saturation conditions. This situation, referred to as controller windup, can produce poor overall control system performance and instability.

Accordingly, it is desirable to include an anti-windup (AW) to improve performance of the motor control system, and in turn the EPS system using the motor control system.

SUMMARY

Technical solutions are described for preventing controller windup in a motor control system. An example system includes a first anti-windup module that receives a commanded voltage and a limited voltage command. The limited voltage command is applied to an electric motor, where the first anti-windup module generates a first modified current command by modifying a current command that is applied to the motor control system. The modification is based on a ratio of the commanded voltage and the limited voltage command. The system further includes a second anti-windup module that receives the commanded voltage and the limited voltage command. The second anti-windup module generates a second modified current command by modifying the first modified current command. The modification based on a difference between the commanded voltage and the limited voltage command.

Further, an example method for preventing controller windup in an electric motor includes generating, by a first anti-windup module, a first modified current command by modifying a current command that is applied to a motor control system based on a ratio of a commanded voltage corresponding to the current command and a limited voltage command. The method further includes generating, by a second anti-windup module, a second modified current command by modifying the first modified current command based on a difference between the commanded voltage and the limited voltage command. The method further includes using, by a controller, the second modified current command as input to determine a voltage to be applied across the electric motor for torque generation.

Further yet, an example system for preventing controller windup in a motor control system includes a current command generator that generates a current command that is input to the motor control system based on a torque command indicative of an amount of torque to be generated using an electric motor. The system further includes a controller that generates a commanded voltage corresponding to the current command. The system further includes a limiting module that determines a limited voltage command in response to the commanded voltage exceeding an available voltage of a motor power source, the limited voltage command being applied to the electric motor. The system further includes an anti-windup module that receives the commanded voltage and the limited voltage command. The anti-windup module generates a modified current command by modifying the current command. The modification is based on a difference between the commanded voltage and the limited voltage command, the anti-windup module uses an integrator back calculation to generate the modified current command. The integrator back calculation includes scaling the difference using a gain matrix $$G_{AW} = \begin{bmatrix} G_{Add} & G_{Adq} \\ G_{Aqd} & G_{Aqq} \end{bmatrix},$$

where $G_{Add}$, $G_{Adq}$, $G_{Aqd}$, and $G_{Aqq}$ are non-zero anti-windup parameters.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
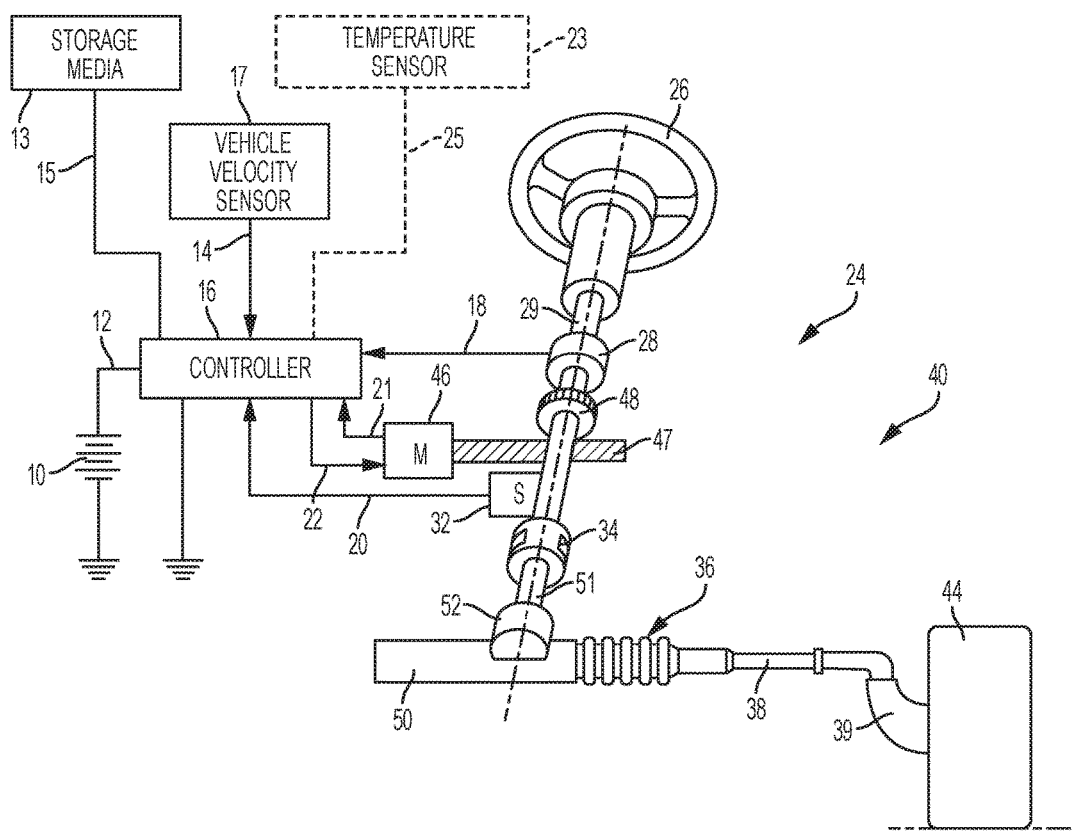
FIG. 1 is an exemplary embodiment of an electric power steering system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
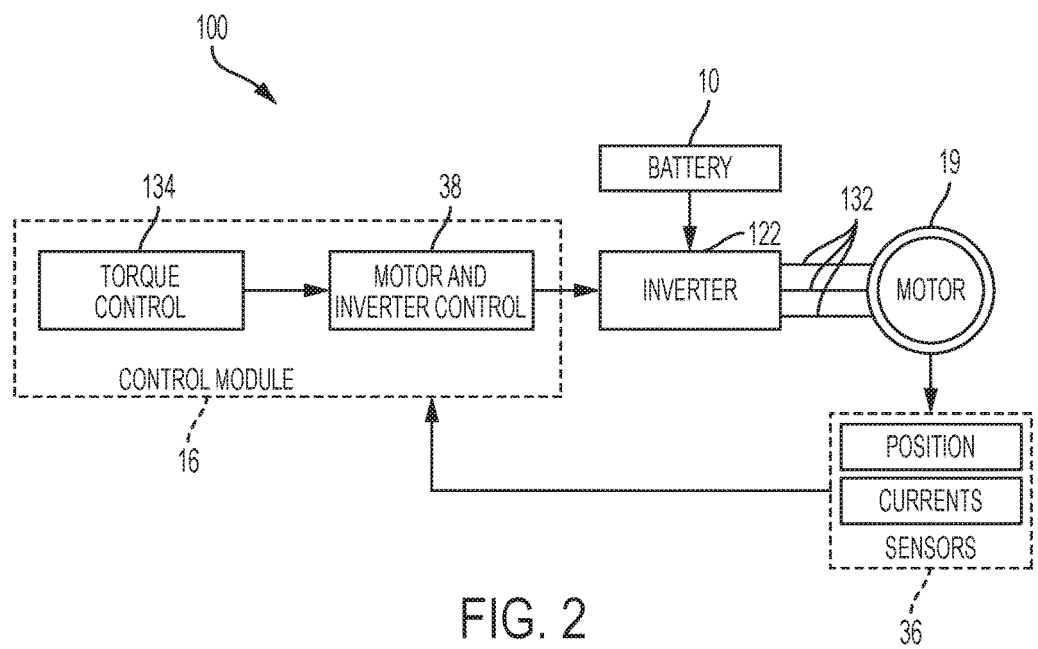
FIG. 2 is an exemplary schematic illustration of a motor control system in accordance with exemplary embodiments.

FIG. 2 depicts a block diagram of a motor control system according to one or more embodiments. The motor control system 100 may be part of the steering system 40, or any other machine that uses a motor to cause displacement, generation of torque, and the like. As depicted, the voltage supply 10 provides a supply voltage $V_B$ to the motor 19. In some embodiments, the voltage supply 10 is a 12-volt battery. However, it is to be understood that other types of voltage supplies may be used as well. In one or more examples, the inverter 122 is connected to the motor 19 by multiple connections 132 (e.g., three connectors) that may be labeled as 'A', 'B' and 'C'. In some embodiments, the motor 19 is a poly-phase, permanent magnet synchronous motor (PMSM). In the examples described herein, the motor 19 is considered a three-phase PMSM, however it should be noted that in other examples, the motor 19 may be a poly-phase motor. The control module 16 is connected to the motor 19 through the inverter.

The control module 16 receives a motor torque command $T_c$ from a torque control system 134 such as, for example, a steering control system. The control module 16 includes control logic for sending a motor voltage command to the motor 19 through the inverter 122.

Figure 3:
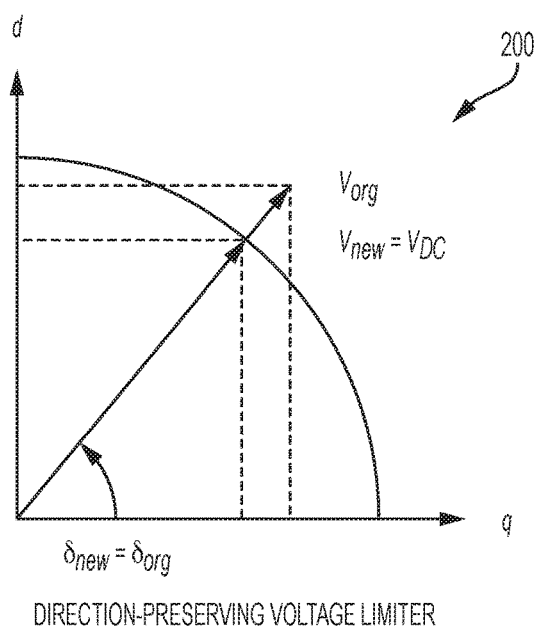
FIG. 3 is a phasor diagram of a motor in accordance with exemplary embodiments.

FIG. 3 with continuing reference to FIG. 2, represents a phasor diagram 200 of a motor control system, in which the commanded voltage is limited by a direction-preserving voltage limiter according to one or more embodiments. In FIG. 3, a voltage magnitude of the direct axis (d-axis) is represented on the vertical axis, whereas a voltage magnitude of the quadrature axis (q-axis) is represented on the horizontal axis. The motor 19 (FIG. 1, 2) may operate such that a magnitude of a motor voltage command $V_R$, shown in FIG. 3 as $V_{org}$ exceeds the capabilities of the inverter 122. Specifically, the inverter 122 may have an input source voltage limitation, $V_{max}$ (labeled $V_{DC}$), which is shown in FIG. 3 as a magnitude of an arc extending between the direct axis (d-axis) and the quadrature axis (q-axis).

To limit the motor voltage command $V_R$ within the operating parameters of the inverter 122 during operational control of the motor 19, $V_{org}$ may be modified. As shown in FIG. 3, the motor voltage command $V_R$ may be limited to a magnitude represented by $V_{new}$ which is less than or equal to $V_{max}$. Therefore, $V_{new}$ is within the sourcing capabilities of the inverter 122. Directional angles of voltage vectors $V_{org}$ and $V_{new}$ are also shown in FIG. 3 as angles $\delta_{org}$ and $\delta_{new}$, respectively. The voltage vectors $V_{org}$ and $V_{new}$ are limited such that the directional angle of $V_{org}$ is preserved (i.e. $\delta_{org} = \delta_{new}$).

Figure 4:
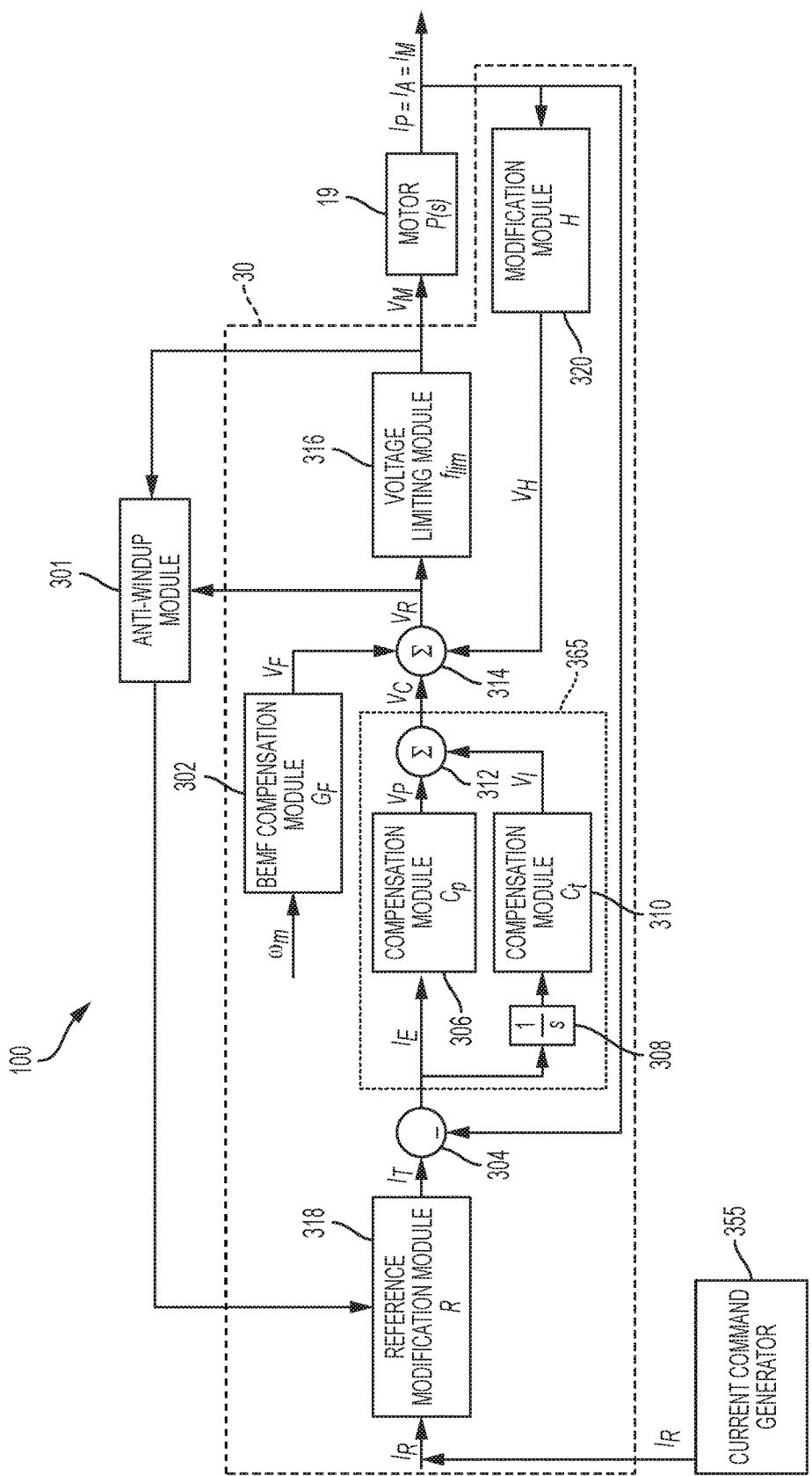
FIG. 4 is an exemplary block diagram of a motor control system including anti-windup module in accordance with exemplary embodiments.

FIG. 4 is a block diagram of a motor control system according to one or more embodiments. The motor control system depicted includes the control module 16 including a voltage limiter module 316, an anti-windup module 301, a reference modification module 318, and a current command generator 355, among other sub-modules, to control the operation of the motor 19. It should be noted that although the modules are depicted separately, in one or more examples, one or more of the depicted modules may be combined, or separated differently than the illustration.

As shown, the control module 16 includes several sub-modules—a Back Electro-Motive Force (BEMF) compensation module 302, a proportional-integral (PI) controller 365 (that includes compensation modules 306 and 310, and an integration module 308), a modification module 320, a subtraction module 304 and addition modules 312, 314.

The motor 19 is a plant that is being controlled by the control module 16. That is, the motor 19 receives an actual motor voltage command $V_M$. The actual motor voltage command $V_M$ is based on a motor voltage command $V_R$. The actual motor voltage command $V_M$ may be limited by the limiting module 316, depending on whether the motor voltage command $V_R$ exceeds the capabilities of inverter 122 or other power source of the motor 19. The motor 19 generates torque and current (i.e., draws or outputs the current $I_A$, which is the actual motor current as described above by reference to FIGS. 1-3). The following equations defined in the d/q axis coordinate frame describe the plant transfer function (using line to neutral definitions) of the plant of the motor 20:

$$V_d = L_d \frac{dI_d}{dt} + RI_d + \frac{N_p}{2}\omega_m L_q I_q \quad \text{(Equation 1)}$$

$$V_q = L_q \frac{dI_q}{dt} + RI_q - \frac{N_p}{2}\omega_m L_d I_d + K_e \omega_m \quad \text{(Equation 2)}$$

$$T_e = \frac{3}{2}K_e I_q + \frac{3}{4}N_p(L_q - L_d)I_d I_q \quad \text{(Equation 3)}$$

Where $V_d$, $V_q$ are the d/q motor voltages (in Volts), $I_d$, $I_q$ are the d/q motor currents (in Amperes), $L_d$, $L_q$ are the d/q axis motor inductances (in Henries), R is the motor circuit (motor plus controller) resistance (in Ohms), $K_e$ is the motor BEMF coefficient (in Volts/rad/s), $\omega_m$ is the mechanical motor velocity in (in rad/s), and $T_e$ is the electromagnetic motor torque (in Nm).

In some embodiments, the limiter module 316 is a direction preserving voltage limiter that maintains the original phase angle while reducing the magnitude to the maximum available voltage. However, other voltage limiters may be used for the limiter module 316 that modify both the magnitude and the angle of the voltage command. The limiter module 316 outputs a limited voltage command represented by $V_M$.

The current command generator 355 converts a torque command into current commands considering multiple objectives and constraints such as minimum loss and supply voltage limit. In one or more examples, the current command ($I_R$) is generated based on a torque equation. The torque equation that provides $T_e$ is nonlinear and represents sum of the torque developed by leveraging the magnetic field from the permanent magnets, and the reluctance torque generated by rotor saliency (difference between $L_d$ and $L_q$) and proper choice of $I_q$ and $I_d$.

Further, the flux linkages of the plant may be expressed as:

$$\lambda_d = L_d I_d - \lambda_m = L_d I_d - \frac{2}{N_p}K_e \quad \text{(Equation 4)}$$

$$\lambda_q = L_q I_q \quad \text{(Equation 5)}$$

Note that the d-axis flux linkage comprises the flux due to the permanent magnets $\lambda_m$, and an opposing flux component due to the d-axis stator current. In terms of the flux linkages, the voltage equations may be restated as:

$$V_d = \dot{\lambda}_d + \omega_e \lambda_q + I_d R \quad \text{(Equation 6)}$$

$$V_q = \dot{\lambda}_q + \omega_e \lambda_d + I_q R \quad \text{(Equation 7)}$$

In, the steady state, the voltage equations may become, $$V_d = \omega_e \lambda_q + I_d R \quad \text{(Equation 8)}$$

$$V_q = -\omega_e \lambda_d + I_q R \quad \text{(Equation 9)}$$

The motor 19 together with the control module 16 makes up a closed-loop system that has a certain frequency response characteristic. As can be appreciated, the frequency response of the closed-loop system is governed by a set of model equations that defines a transfer function that transforms the input current command $I_R$ to the output current $I_M$. In other words, the control module 16 regulates the output current $I_M$ by sending the actual motor voltage command $V_M$ generated based on the input current command $I_R$. $I_M$ is the current measured and fed back to the control module 16.

The modification module 320 takes as input from the motor 19 the measured feedback current $I_M$. Based on the measured feedback current $I_M$, the modification module 320 decouples the d-axis component $I_d$ of the output current $I_A$ from the variations of the q-axis current component $I_q$.

The compensation modules 306 and 310 make up a matrix-valued (or, multi-dimensional) PI controller 365 that compensates for a difference $I_E$ between a commanded current $I_R$ and the measured current $I_M$ to control the motor 19. The compensation module 306 produces a proportional voltage command $V_P$ from a difference current $I_E$ (determined by the subtraction module 304). The compensation module 306 along with the integration module 308 produces an integral voltage command $V_I$. The addition module 312 combines the voltage commands $V_P$ and $V_I$ to produce a voltage command $V_C$. The proportional voltage command $V_P$ and the integral voltage command $V_I$ are determined in such a way that the combined voltage command $V_C$, when applied to the motor 19, causes the overall current to current transfer function to be of a specific, desired order. It is to be noted that each of $I_R$, $I_M$, $I_E$, $V_P$, $V_I$, and $V_C$ has a d-axis component and a q-axis component. Also, $I_R$, $I_M$, $I_E$, $V_P$, $V_I$, and $V_C$ represent vectors and not scalar values, each consisting of a d-axis and a q-axis signal (quantity).

The compensation module 306 is a proportional controller and the compensation module 310 is an integral controller, together being part of the PI controller 365. The proportional compensation module $C_P$ aids in configuring the frequency response of the closed-loop system when the first order type response is desired, in addition to providing beneficial tradeoffs between the motor input disturbance transfer function behavior and the current measurement noise transfer function behavior. When a higher order transfer function (e.g., a third order) is desired, a different configuration than the PI controller 365 is utilized. For example, only an integrator module 308 and compensation module ($C_I$) 308 may be used, without the proportional compensator ($C_P$) 306. In such cases the output of the PI controller 365 is just the $V_I$, which may be further compensated by the BEMF compensator 302 to generate PI controller output $Y_R$.

As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 4, or any other figures herein, may be combined and/or further partitioned.

In some embodiments, the control module 16 is a feedback controller having a closed-loop. That is, the output current of the motor 19 is fed back to the control module 16 and the control module 16 uses the feedback to regulate the output of the motor 19. As the output current $I_M$ is fed back to the control module 16, a controller windup may be generated, where motor voltage command $V_R$ may exceed actual motor voltage command $V_M$. This can lead to instability in a motor control system because of a windup condition that is generated in this circumstance, which is a technical challenge addressed by the technical solutions described herein.

Control systems are typically designed to satisfy a set of linear performance metrics, but the control systems typically utilize actuators, such as inverters, that have operating limits. Controller windup may occur when the control module 16 produces control signals that are beyond actuator capabilities, causing saturation. Under a saturation condition, the control signals that are applied to the plant are limited and every component of the controller that has memory (or states) is updated incorrectly. This condition can result in controllers with memory accumulating large errors, which can return to correct values only after the system has come out of saturation and remained in this condition for a period of time. Thus, when controller windup occurs, the system can potentially remain in the saturated condition for a period of time longer than desirable, and ultimately degrade overall performance. The technical solutions described herein address such a technical challenge by facilitating preventing controller windup occurrences.

Further, particularly in PMSM drive systems in EPS systems, the DC bus voltage is supplied by the vehicle battery 10. Typically, to make the most use of the PMSM's capability, the drive system is operating in the maximum torque per voltage (MTPV) mode in which the PMSM can generate the maximum torque under the given battery voltage. During operation near the voltage limit, the actuator is more likely to saturate, especially under the presence of parameter errors or when the motor control system is subjected to external disturbances or failures. The technical solutions described herein address such a technical challenge by facilitating preventing controller windup occurrences using an anti-windup module 301.

As described in more detail below, the anti-windup (AW) module 301 selectively detects a voltage saturation condition and supplies an accurate representation of the actual motor voltage command $V_M$ to an input of the motor control system, thereby improving system performance A voltage saturation condition may occur when a vector summation of an output of the current regulators of both the d and q axes current loops becomes greater in magnitude than the available DC link voltage $V_{Dc}$. A voltage saturation may be expressed according to the following equation:

$$\sqrt{V_{dR}^2 + V_{qR}^2} \geq V_{DC} \qquad \text{(Equation 10a)}$$

The AW module 301 implements an anti-windup in addition to the decoupling of the current control to ensure that the control states with memory characteristics are bounded when the calculated commands exceed the operational range of the inverter 122. The typical anti-windup algorithms feed the difference of the limited and original control signals via a linear decoupled compensator (typically static, i.e., containing no dynamical terms) to the input of the controller 16. Alternatively, typical AW algorithms limit the outputs of compensation modules 306 and 310 based on the difference between feedforward and feedback signals. However, such typical anti-windup solutions fail to provide anti-windup over a broad range of linear current regulator configuration, which is a technical challenge, especially in PMSM drive in machines like an EPS. The AW module 301 described herein addresses the technical challenge by providing a dynamic anti-windup by directly modifying the current commands taking into consideration the nonlinear behavior of the dq axis voltages versus the battery voltage ($V_B$).

Figure 5:
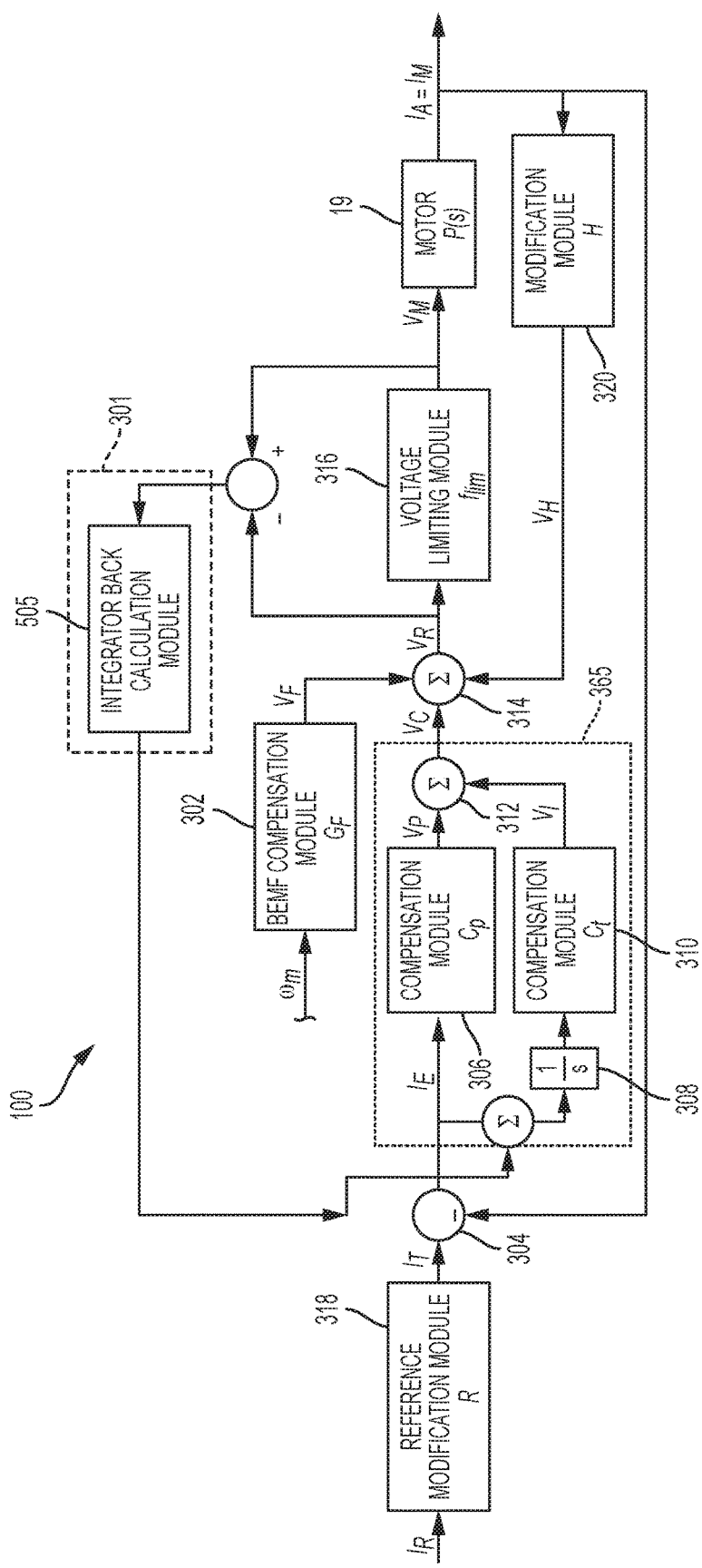
FIG. 5 is an exemplary block diagram of a motor control system detailing an anti-windup module in accordance with exemplary embodiments.

FIG. 5 depicts details of the anti-windup module 301 according to one or more embodiments. The anti-windup module 301 includes an integrator back calculation (IBC) module 505. The IBC module 505 limits the input and output of the PI controller 365 when voltage limiter 316 is activated (or when the motor control system reaches the voltage limit). When the motor control system 100 is settled to steady-state, the modified input of the integrator 308 is zero while the output keeps constant. Because the PI controller 365 is always in operation, the motor control system 100 transitions from unsaturation to saturation in a seamless and smooth manner. The IBC module 505 takes the difference between the post-limited and pre-limited voltages as the input of a linear transfer function matrix $G_{AW1}$ and feeds the output of the matrix $G_{AW1}$ to the input of the PI controller 365 to limit the PI controller 365 output ($Y_R$), after the being compensated by the BEMF compensator 302.

For the feedback motor control system 100, changing the PI controller input is equivalent to changing the current commands ($I_G$). In order to understand the behavior of the IBC module 505, a new variable is computed, which is referred to as an achievable command $I_R^{AC}$, which if had been applied instead of the actual command would have prevented the motor control system from being voltage limited or saturated. In that case, the voltage commands, without the voltage limiter, could be expressed as follows.

$$V_R = V_M = V_F + HI_M + \left(\frac{1}{s}C_I\right)(I_R^{AC} - I_M) \qquad \text{(Equation 11)}$$

The actual voltage command prior to saturation limit can be written as shown below.

$$V_R = V_F + V_H + V_I \qquad \text{(Equation 12)}$$
$$= V_F + HI_M +$$
$$\left(\frac{1}{s}C_I\right)(I_R + G_{AW1}(V_M - V_R) - I_M)$$

The difference between the achievable and original current commands as a function of the saturated and pre-limited voltage commands may then be calculated as follows, where S is the Laplace operator, and $C_I^{-1}$ is the inverse of the parameter matrix $C_I$.

$$I_R^{AC} - I_R = (G_{AW1} + sC_I^{-1})(V_M - V_R) \qquad \text{(Equation 13)}$$

In one or more examples, the IBM module 505 uses populates the AW parameter matrix $G_{AW1}$ as a 2×2 matrix, which can be expressed as follows.

$$G_{AW1} = \begin{bmatrix} G_{Add} & G_{Adq} \\ G_{Aqd} & G_{Aqq} \end{bmatrix} \quad \text{(Equation 14a)}$$

The IBC-AW matrix $G_{AW1}$ includes coupling terms, i.e., $G_{Adq}$ and $G_{Aqd}$. These two terms lead to higher flexibility in the controller design and improve the torque tracking performance. Thus, the IBC module 505 uses a gain matrix $G_{AW1}$ with cross-coupling terms, which improve the tracking performance of the IBC module 505. In one or more examples, the individual parameters of the IBC-AW matrix $G_{AW1}$ may be scheduled as functions of various motor control signals, and further, may be computed based on the (estimated) parameters of the PMSM plant.

Figure 6:
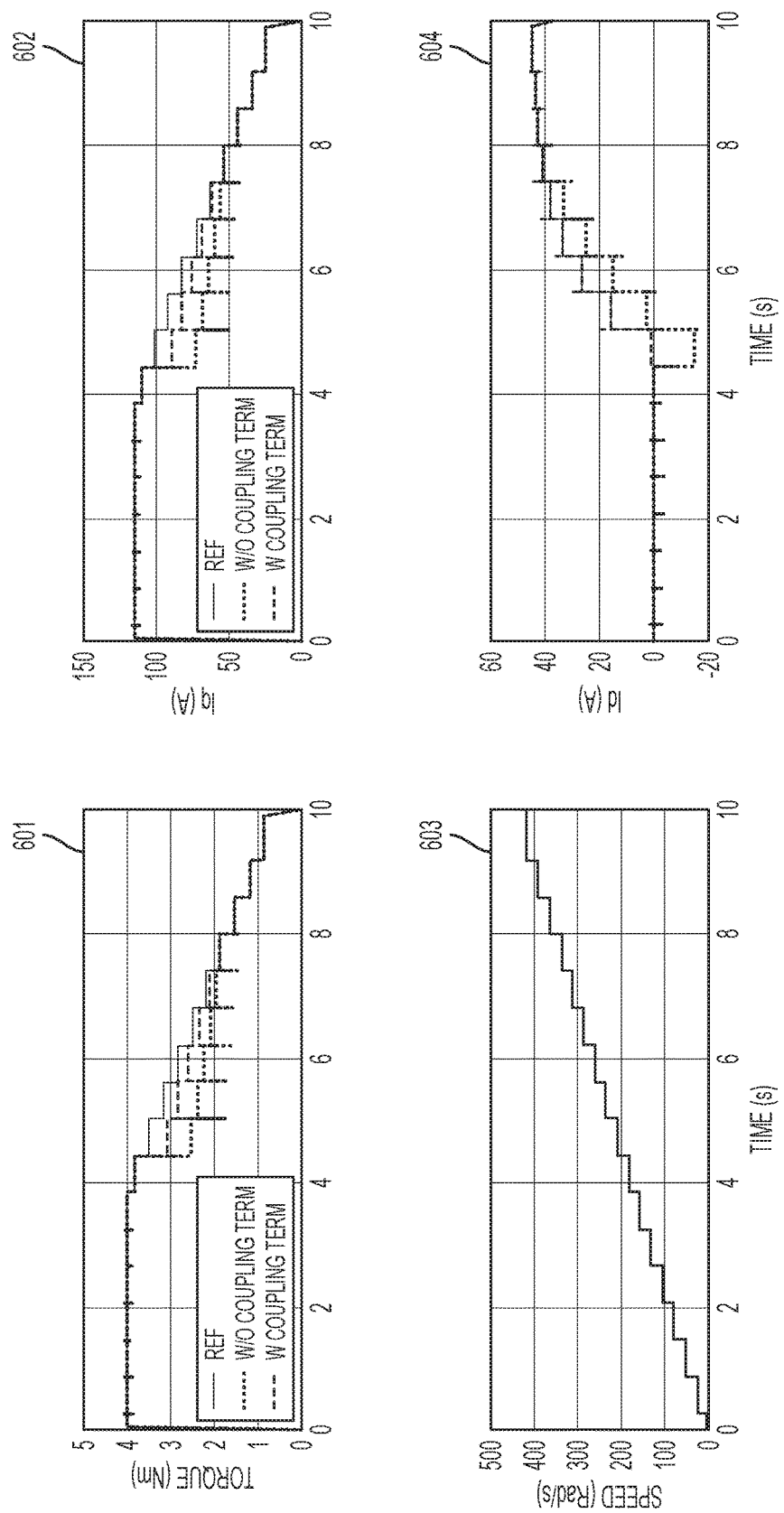
FIG. 6 depicts example results an improved IBC module according to one or more embodiments.

FIG. 6 depicts an example of how the cross-coupling gains improve the performance of the IBC module 505. When the signs of $G_{Adq}$ and $G_{Add}$ are chosen to be different, i.e., $G_{Adq}$ is negative and $G_{Add}$ is positive, the equivalent d-axis current command increases under saturation conditions such that the torque output capability is improved. This allows the IBC module 505 to behave more like a direct reference calculation (DRC) AW, which considers the optimal current command modification strategy under voltage saturation. As can be seen from the data illustrated in the plots 601-604, at different motor speeds (603), and at different torque commands (601), the IBC module 505 with the cross-coupling terms improves tracking of the current commands, $I_d$ and $I_q$ (602 and 604), compared with implementing the IBC module 505 without the coupling terms.

Alternatively, for implementing the IBC module 505 without the coupling terms, the IBC module 505 is configured to use a gain matrix $G_{AW1}$ with $G_{Adq}=G_{Aqd}=0$. In this case, the dq axis AW feedback loops are decoupled, or in other words the d-axis (q-axis) voltage saturations affect the d-axis (q-axis) PI controller 365 only. The simplified IBC parameter matrix $G_{AW1}$ without the coupling terms can be written as follows.

$$G_{AW1} = \begin{bmatrix} G_{Add} & 0 \\ 0 & G_{Aqq} \end{bmatrix} \quad \text{(Equation 14b)}$$

The values of $G_{Add}$ and $G_{Aqq}$ impact the transient behavior when the motor control system 30 enters or exits the saturation condition. The transfer matrix that governs the transient behavior when only an integral controller is used can be expressed as follows.

$$G_{AW1} + sC_I^{-1} = \begin{bmatrix} G_{Add} + s/k_{id} & 0 \\ 0 & G_{Aqq} + s/k_{iq} \end{bmatrix} \quad \text{(Equation 15)}$$

Typically values of $G_{Add}$ and $G_{Aqq}$ gains are pre-selected to settle the motor control system to steady state more quickly. The resultant transfer matrix is thus a static matrix using the preselected values, and thus improves the transient behavior. It should be noted that the preselected values used may be computed dynamically based on one or more control signals and/or other estimated values, in one or more examples. Although the preselected gains in the case of a decoupled $G_{AW1}$ matrix do not change the equilibrium point that the motor control system 100 reaches, the preselection affects the time required to reach the equilibrium, a quicker equilibrium state being desired for stability. Hence, in one or more examples, the gains values are preselected according to cutoff frequencies for the d and q axis AW loops as shown below.

$$G_{AW1} = \begin{bmatrix} 2\pi f_d / k_{id} & 0 \\ 0 & 2\pi f_q / k_{id} \end{bmatrix} \quad \text{(Equation 14c)}$$

where $f_d$ and $f_q$ are the cut-off frequency of the d and q axis AW loops and may be chosen to above a predetermined threshold to facilitate smooth and stable transient behavior. In one or more embodiments, the matrix gains or the cut-off frequencies may be computed in real-time as a function of various system signals and parameters.

Figure 7:
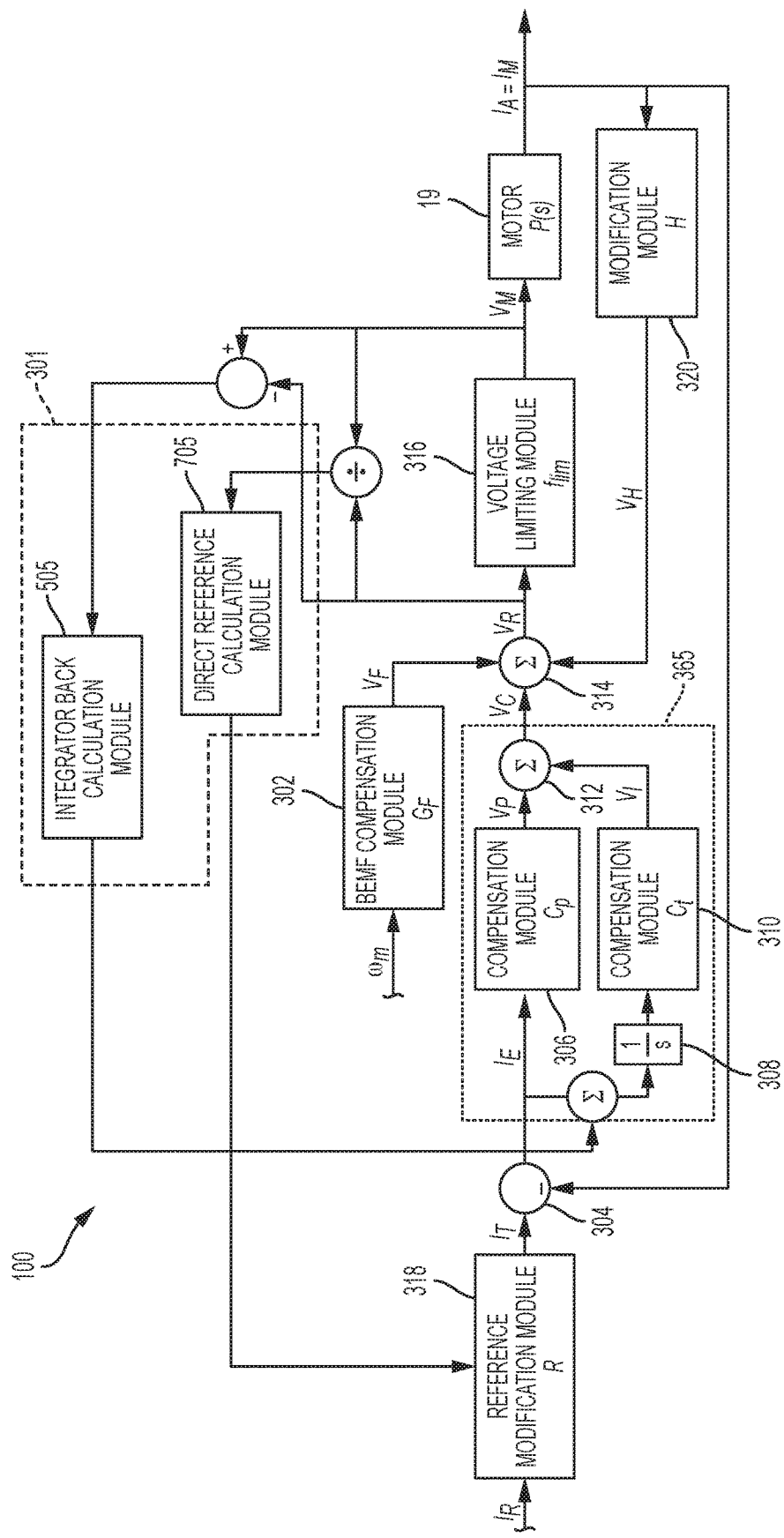
FIG. 7 is an exemplary block diagram of a motor control system detailing an anti-windup module in accordance with exemplary embodiments.

FIG. 7 depicts details of the anti-windup module 301 according to one or more embodiments. The anti-windup module 301, in one or more examples, includes the integrator back calculation (IBC) module 505, and a direct reference calculation (DRC) module 705. The DRC module 705 provides a higher steady-state torque output than the IBC module 505 when the motor control system is saturated. The IBC module 505 performs better than the DRC module 705 in improving the stability and the robustness of the closed-loop system. When using a DRC-only anti-windup, typically, limits are on the PI controller output are implemented to prevent the system from instability. However, with the output bounded, the DRC-only anti-windup may lose the advantage of tracking the steady-state torque output. Such a technical challenge is addressed by the technical solutions described herein by combining the anti-windup provided by the DRC module 705 and the IBC module 505 in specific ways to include the advantages of both the techniques.

Figure 8:
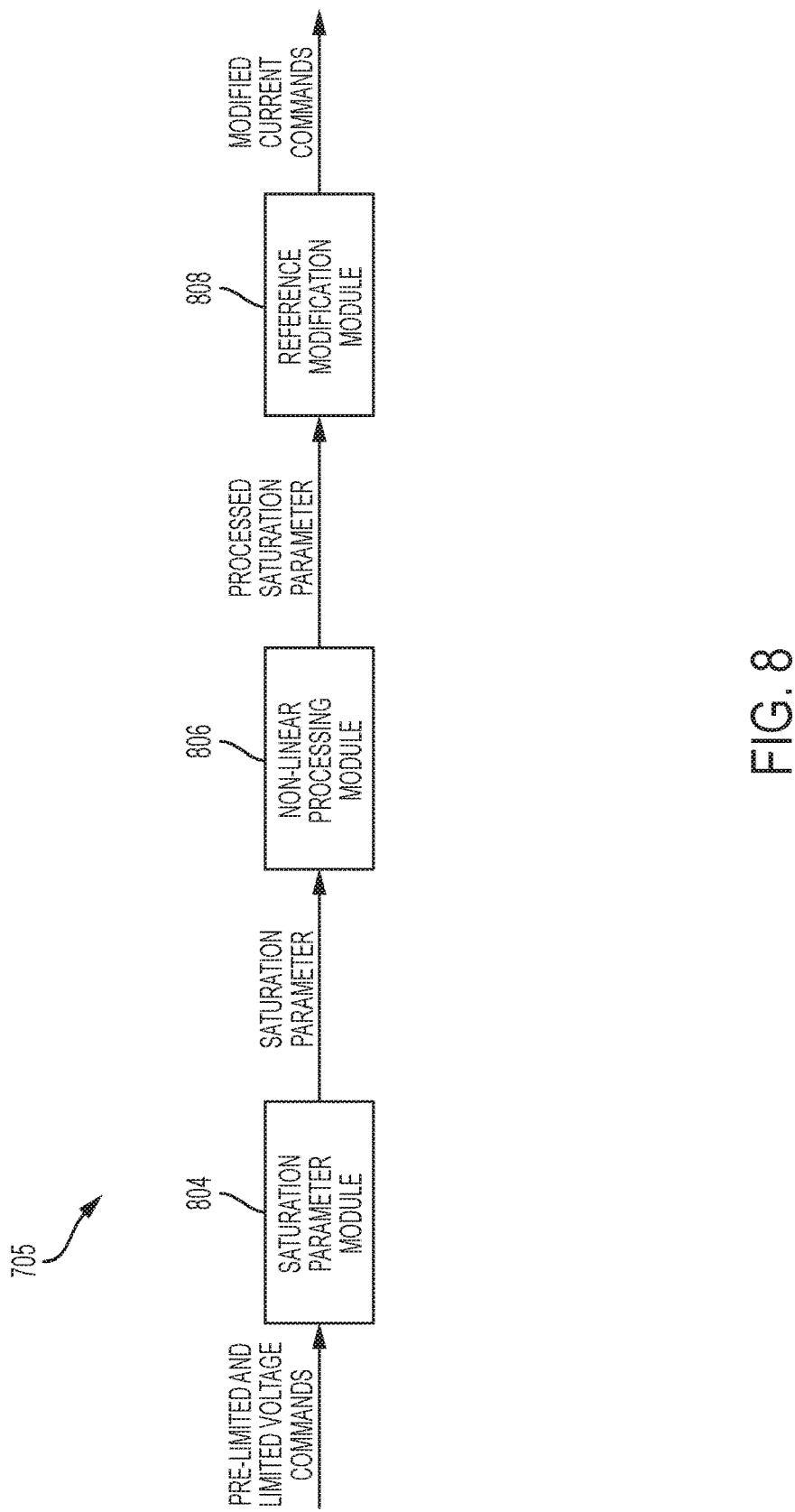
FIG. 8 depicts a block diagram for the operation of a DRC module according to one or more embodiments.

FIG. 8 depicts a block diagram for the operation of the DRC module 705 according to one or more embodiments. The DRC module 705 receives the pre-limited and post-limited voltage commands corresponding to the limiter module 316 and modifies the current commands to the controller 16. The limiter module 316 determines if the commanded voltage $V_R$ exceeds a maximum available supply voltage. In the case the commanded voltage $V_R$ exceeds the maximum available supply voltage or a set threshold voltage, the magnitude of the voltage vector $V_M$ is set equal to the following value based on the following equation according to some embodiments:

$$|V_M| = V_{DC} \quad \text{(Equation 10b)}$$

Referring to FIG. 8, the DRC module 705 includes a saturation parameter module 804. The saturation parameter module 804 computes a saturation parameter, which is a value indicative of a magnitude of saturation. In some embodiments, the saturation parameter is related to the degree by which the motor voltage command $V_R$ exceeds an available voltage that can be provided by the control loop to the motor 19. Accordingly, the degree of saturation $\gamma_V$ may represent a ratio of the voltage command and the actual voltage provided to the motor 19. The degree of saturation $\gamma_V$ defined by the following equation:

$$\gamma_V = \frac{|V_R|}{V_{DC}} \quad \text{(Equation 16)}$$

where $|V_R|$ is the magnitude of the motor voltage command $V_R$ and $V_{DC}$ is a supply voltage. The voltage saturation nonlinearity may be radial geometrically, and the degree of saturation $\gamma_V$ may be more accurately detected by utilizing a ratio of the total voltage vector magnitudes rather than differences of the original and limited control signals. As can be appreciated by the above equation, the DC link voltage $V_{DC}$ is used for accuracy, as actual motor voltage command $V_M$ may not accurately represent the voltage that the inverter is capable of providing. More specifically, $V_M$ is inaccurate for calculating $\gamma_V$ when the voltage limiting is not performed by the direction preserving voltage limiter 316.

In another embodiment, the saturation parameter is expressed relative to an amount of saturation $\gamma_{Va}$, which may be additionally calculated by the saturation parameter module 804 by using the following equation:

$$\gamma_{Va} = \frac{|V_R| - V_{DC}}{V_{DC}} \tag{Equation 17}$$

The amount of saturation $\gamma_{Va}$ defines the magnitude of the commanded voltage from the maximum voltage limit circle, defined by the arc represented by $V_{max}$ in FIG. 3. Again, a scaled version of $V_{DC}$ similar to one mentioned above, may also be used.

By utilizing the ratios defined above in the calculations, for example, for the degree of saturation $\gamma_V$ and amount of saturation $\gamma_{Va}$, the geometry of the voltage constraint is considered. In other words, the direction of the voltage constraint is retained, and therefore the DRC module 705 may more accurately determine a modified current command, compared to the decoupled IBC module 505 (i.e., with no cross-coupling gains). These modified current commands facilitate preventing integrator 308 windup.

In addition, the saturation parameter module 804 calculates a saturation parameter. In some embodiments, the saturation parameter is an inverse degree of saturation $\gamma_{Vinv}$ defined by the following equation:

$$\gamma_{Vinv} = \frac{1}{\gamma_V} \tag{Equation 17}$$

Alternatively, the saturation parameter may be an inverse of the amount of saturation $\gamma_{Va}$. A ratio that may computed by the saturation degree module 804 from $\gamma_{Va}$ is the limited amount of saturation defined as:

$$\gamma_{Valim} = \min(1 - \gamma_{Va}, 1) \tag{Equation 18}$$

For high bandwidth systems, where $\gamma_{Va}$ can become larger than unity in some circumstances, may result in $\gamma_{Valim}$ having reduced accuracy.

The saturation parameter module 804 outputs the saturation parameter to a non-linear processing module 806.

The nonlinear processing module 806 of the DRC module 705 reduces noise on the output of the saturation parameter without being influenced by a previous state, thereby generating a processed saturation parameter. The non-linear processing module 806 does not include a memory and does not use any historical information of the input signal. Transient saturation rather than steady state saturation is the more important issue in practical control systems since the reference changes continuously. Coupled with the requirement of high bandwidth current regulation for several different reasons, the above voltage limiter scheme can sometimes result in a noisy reference, ultimately resulting in noisy outputs. A standard low-pass filter to reduce this noise is not desirable because not only does the filter introduce lag in the feedback, but it has states, and thus may itself suffer from windup, causing a variation in the signal.

The nonlinear processing module 806 acts similar to a pseudo-filter and is implemented by utilizing a nonlinear function F whose output y(t) is a function of the present input x(t) and not on previous values (or states) of the input. Mathematically, this operation may be defined as shown below.

$$y(t) = F(x(t)) \tag{Equation 19}$$

In some embodiments, the nonlinear processing module 806 is a square-root function. It should be noted that other functions may be utilized, with some of the requirements being that the output may only be a function of the present value of the input, and not dependent on previous states; the function may pass through the origin (i.e., output should be zero when input is zero), and the output may be equal to the input when the input is unity. Such functions reduce the transient spikes on the voltage ratios because of their smooth shape. An example of a non-linear processing (pseudo-filtering) function is defined by the following equation:

$$\gamma_d = \sqrt{\gamma_{Vinv}} \tag{Equation 20}$$

A reference modification module 808 generates a modified current command from the processed saturation parameter.

The reference modification module 808 may utilize a reference modification function that increases $I_d$ and reduces $I_q$. The flux commands may be modified based on the extent of voltage saturation. In general, the flux commands may be modified by utilizing two ratios $\gamma_d$ and $\gamma_q$ that are functions of the extent of voltage saturation. These ratios may be defined as:

$$\gamma_d = \frac{\lambda_{dT}}{\lambda_{dR}} = \frac{L_d I_{dT} - \lambda_m}{L_d I_{dR} - \lambda_m} \tag{Equation 21}$$

$$\gamma_q = \frac{L_q I_{qT}}{L_q I_{qR}} = \frac{I_{qT}}{I_{qR}} \tag{Equation 22}$$

By solving the above equations, the modified current references are obtained as:

$$I_{dT} = (1 - \gamma_d)\frac{\lambda_m}{L_d} + \gamma_d I_{dR} \tag{Equation 23}$$

$$I_{qT} = \gamma_q I_{qR} \tag{Equation 24}$$

The quantity $$\frac{\lambda_m}{L_d}$$

is a maximum possible value of the d-axis current, at which the total d-axis flux linkage becomes zero. This may be defined as $$I_{dmax} = \frac{\lambda_m}{L_d}.$$

In addition, the reference modification function may be a straight-line that transitions the control system operation into an enhanced field-weakening mode, the extent of which is determined by the ratio $\gamma_d$. It may also be seen that the modified reference can only become $I_{dmax}$ if $\gamma_d$ becomes zero, which is very unlikely in practical motor control applications.

The aforementioned d-axis equation may be utilized for reference modification by using different values of $I_{dmax}$, using the following reference modification equations.

$$I_{dT} = (1-\gamma_d)I_{dmax} + \gamma_d I_{dR} \quad \text{(Equation 25)}$$

$$I_{qT} = \gamma_q I_{qR} \quad \text{(Equation 26)}$$

In this case the ratio no longer represents flux modification. One alternative value may be defined as:

$$I_{dmax} = (1 \pm \alpha_d)\frac{\lambda_m}{L_d} \quad \text{(Equation 27)}$$

Here, $\alpha_d$ is a positive scalar, typically a fraction less than unity, which results in a maximum d-axis current value which is more or less than the value based on the flux limit.

Another value of the d-axis maximum current may be computed online, based on the q-axis reference current and another limit on the total current, which may be due to the inverter or the machine. For instance, a current limit $I_{lim}$ may be defined based on the stall current on the machine, or on the maximum capability of the FETs used. With this, the d-axis maximum current may be computed as, $$I_{dmax} = \sqrt{I_{lim}^2 - I_{qR}^2} \quad \text{(Equation 28)}$$

$I_{dT}$ and $I_{qT}$ are modified current references that represent the current commands to the controller 16.

Referring back to FIG. 7, the block diagram depicts the hybrid anti-windup provision using the combination of the IBC module 505 and the DRC module 705. In the hybrid AW scheme, the IBC module 505 protects the PI controller 365 from windup during operation of the motor control system 100 irrespective of operating parameters. The DRC module 705 improves the torque tracking performance of the AW module 301 by increasing d-axis current to provide a corresponding amount of q-axis current. The selection of the AW gain matrices $G_{AW1}$ and $G_{AW2}$ is done using the criterion described herein, the $G_{AW2}$ matrix being a gain matrix used by the DRC module 705. In one or more examples, $G_{AW2}$ is a nonlinear function which includes terms expressed in the equations from (19) to (28), and FIG. 8 illustrates the subsystems of a nonlinear function $G_{AW2}$.

Figure 9:
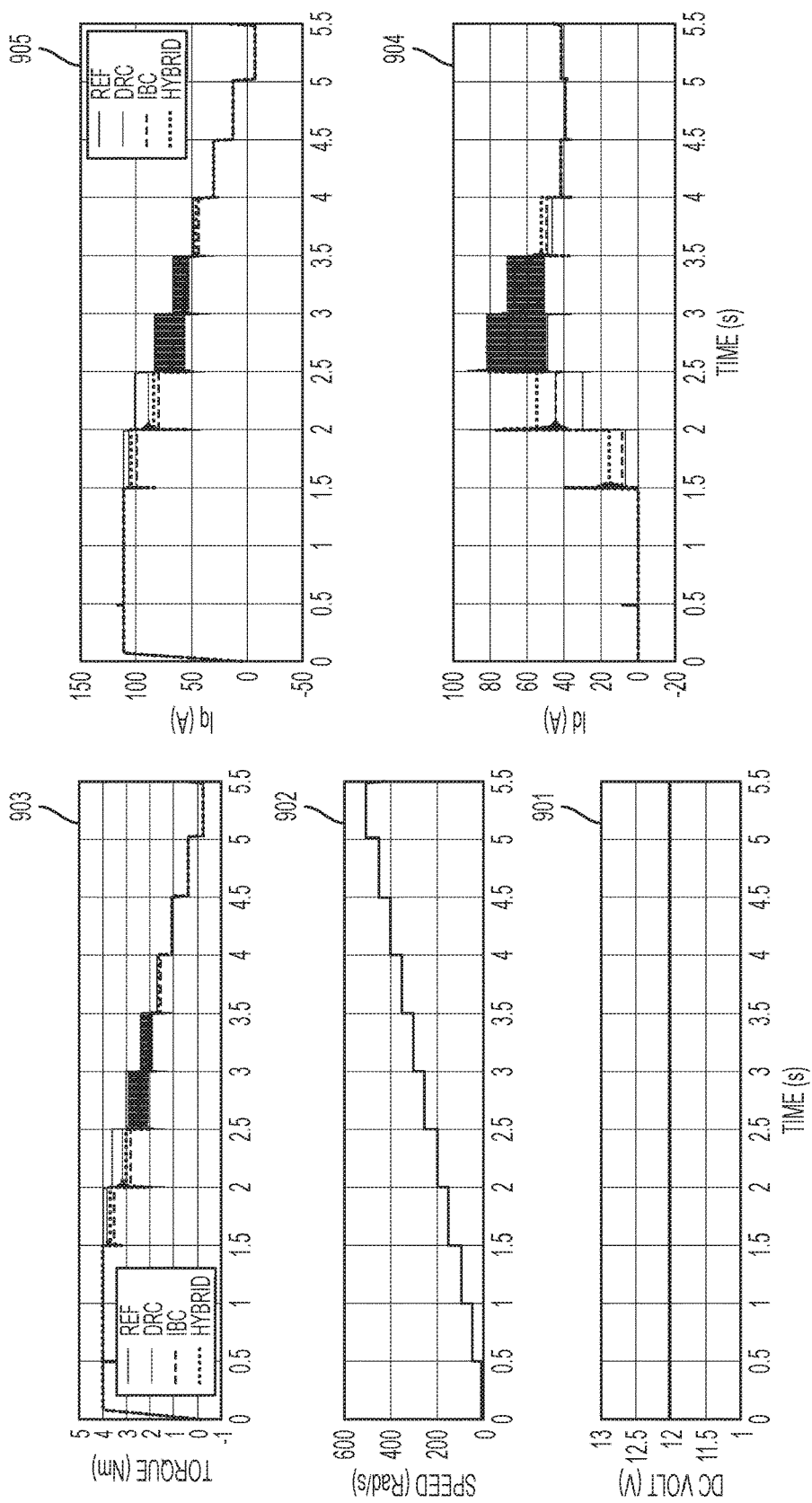
FIG. 9 depicts example results of using a hybrid anti-windup according to one or more embodiments.

FIG. 9 depicts example results of using the hybrid anti-windup as described herein according to one or more embodiments. It should be noted that example results described herein are for specific example scenarios with corresponding configuration settings, and that in other examples, different configuration settings can provide different results than those described herein. The plot 901 depicts DC input voltage; plot 902 depicts motor speed; and plot 903 depicts torque command vs. actual torque. Further, plot 904 depicts command and actual d-axis current; and plot 905 depicts command and actual q-axis current.

It can be seen from plots 901, 902, and 903 that in this specific example, from about 150 rad/s motor speed, the actual torque produced by the PMSM 19 cannot track the command because of voltage limit. The plots depict three different AW techniques. The DRC module 705 alone provides the highest possible torque; the IBC module 505 alone provides the lowest; and the hybrid AW module 301 is in the middle. However, during 2.5-3.5 s, large torque ripples are seen in case of the DRC module 705 is used alone. These torque ripples are not found with IBC module 705 and hybrid AW module 301 use. The plots 904 and 905 also follow a similar pattern.

Figure 10A:
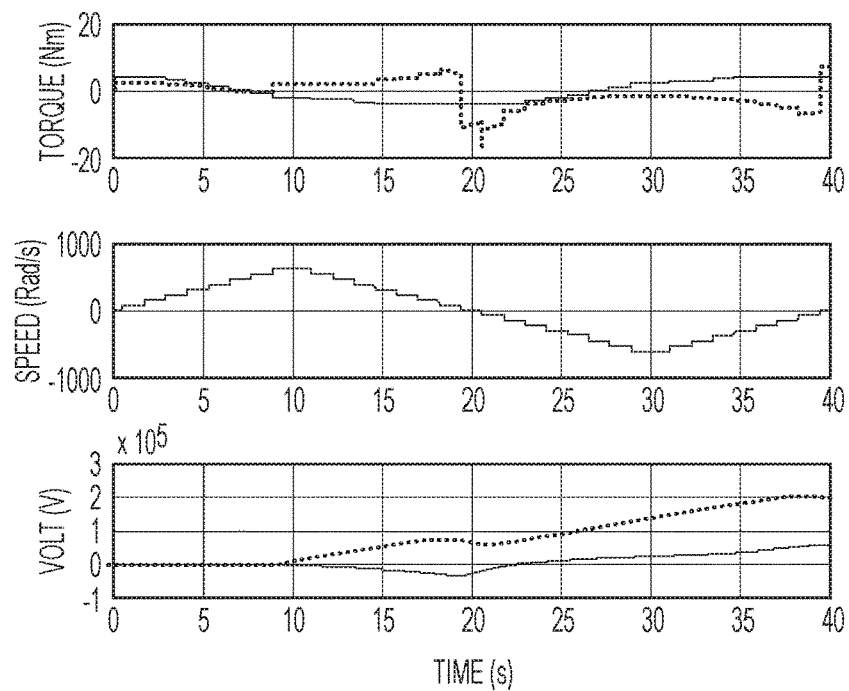
FIG. 10A and FIG. 10B depict example results for different anti-windup implementations according to one or more embodiments.
Figure 10B:
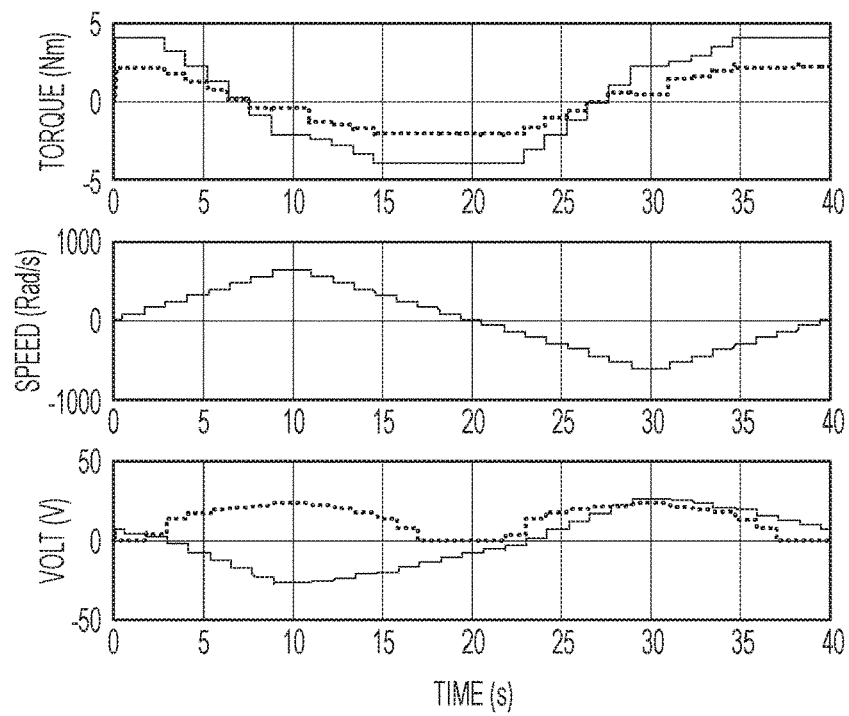

Thus, the DRC module 705 alone may output higher torque, however may also lead to system instability in specific operating conditions. The unstable behavior under large machine parameter estimation error when using DRC-only AW is shown in FIG. 10(a). Further, FIG. 10(b) shows results of using the hybrid AW and in which no such issue is observed. The corresponding PI controller output is bounded and stays within a reasonable predetermined range. FIG. 10 depicts example results for different anti-windup implementations according to one or more embodiments.

The hybrid anti-windup provided by the AW module 301 using a combination of the IBC module 505 and the DRC module 705, as described herein, facilitates the controller 16 to operate with system stability and torque tracking capability under voltage saturation conditions.

The technical solutions described herein address the technical challenges regarding windup of a motor control system. The technical solutions described herein use an IBC with cross coupling parameters in a gain matrix, in one or more examples. Further, in one or more examples, the technical solutions described herein use a hybrid combination of DRC and IBC to achieve optimal torque tracking as well as noise performance. The technical solutions described herein do not require integrator limits and can maintain system stability in the presence of system failures. Further, the hybrid technique can also use the IBC with cross-coupling gains in order to further improve the torque tracking capabilities of the electric drive control system.

Figure 11:
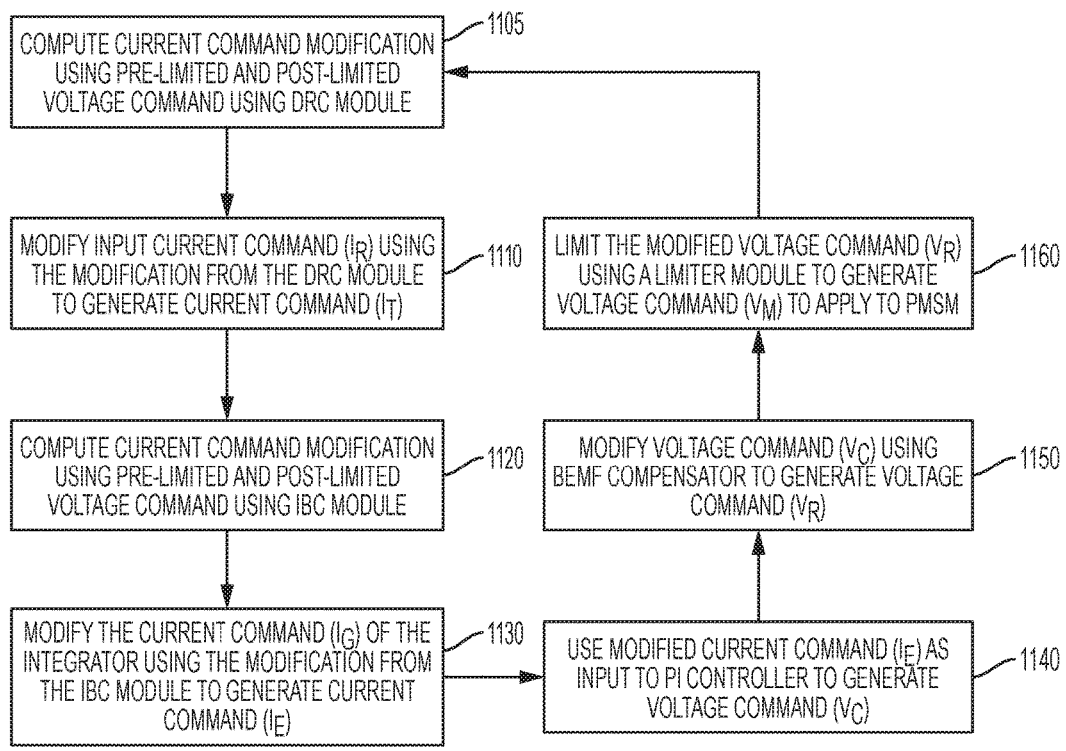
FIG. 11 is an exemplary block diagram of an anti-windup method in accordance with exemplary embodiments.

FIG. 11 is a flow diagram for a control method that can be performed by the control module 16 in accordance with some embodiments. As can be appreciated in light of the disclosure, the order of operation within the method is not limited to the sequential execution as illustrated in FIG. 11, but may be performed in one or more varying orders as applicable and in accordance with the present disclosure.

The method includes compute current command modification using pre-limited ($V_R$) and post-limited voltage command ($V_M$) using the DRC module 705, as shown at 1105. For the DRC module computations, the control module 16 determines a limited voltage command in response to a commanded voltage exceeding an available voltage of a motor power source. The limited voltage command may be applied to an electric motor. Further, the control module 16 determines a saturation parameter based on the limited voltage command. The saturation parameter indicates a magnitude of the commanded voltage exceeding the available voltage. Further yet, for the DRC computations, the control module 16 determines a processed saturation parameter by utilizing a non-linear smoothing function. The DRC module 705 generates a current command based on the processed saturation parameter. The modified current command is applied to the control system 100 to improve current command tracking, as shown at 1110.

Further, the method includes computing a modified current command using the IBC module 505, as shown at 1120. The resulting modification from the IBC module is applied to the current command of the integrator 308 that is already modified using the DRC module 705, as shown at 1130. The modified current command is further used as input to the integrator 308 to generate voltage command $V_I$ and thus Vc as well, as shown at 1140. The voltage command (Vc) may be a combination, for example, a sum of voltage commands from a proportional controller 306 and the integral controller 310.

The voltage command Vc is compensated using a BEMF compensator to generate a compensated voltage command $V_R$, as shown at 1150. The compensated voltage command $V_R$ is limited to generate a motor voltage command $V_M$ by the limiting module 318, as shown at 1160. The voltage motor command is applied to the PMSM motor 19. The method continues in a loop using the latest $V_R$ and $V_M$ voltage commands to prevent windup of the motor control system 100.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A system for preventing controller windup in a motor control system, the system comprising:
   a first anti-windup module that receives a commanded voltage and a limited voltage command, the limited voltage command is applied to an electric motor, the first anti-windup module generates a first modified current command by modifying a current command that is applied to the motor control system, the modification is based on a ratio of the commanded voltage and the limited voltage command; and
   a second anti-windup module that receives the commanded voltage and the limited voltage command, the second anti-windup module generates a second modified current command by modifying the first modified current command, the modification based on a difference between the commanded voltage and the limited voltage command, the second modified current command used to generate a torque using the electric motor.

2. The system of claim 1, further comprising:
   a limiting module that determines the limited voltage command in response to the commanded voltage exceeding an available voltage of a motor power source.

3. The system of claim 1, further comprising:
   a current command generator that generates the current command that is input to the motor control system based on a torque command indicative of an amount of torque to be generated using the electric motor.

4. The system of claim 1, wherein the second anti-windup module uses an integrator back calculation to generate the second modified current command, the integrator back calculation comprising scaling the difference using a gain matrix $$G_{AW} = \begin{bmatrix} G_{Add} & G_{Adq} \\ G_{Aqd} & G_{Aqq} \end{bmatrix},$$

where $G_{Add}$, $G_{Adq}$, $G_{Aqd}$, and $G_{Aqq}$ are anti-windup parameters.

5. The system of claim 4, wherein the anti-windup parameters are based on cutoff frequencies for d-axis and q-axis of closed-loop current controller.

6. The system of claim 4, wherein $G_{Aqd}$ and $G_{Adq}$ are set to zero.

7. The system of claim 1, wherein the first anti-windup module uses a direct reference calculation to generate the first modified current command.

8. The system of claim 7, the first anti-windup module further comprising:
   a saturation parameter module that determines a saturation parameter based on the limited voltage command, the saturation parameter indicates a magnitude of the commanded voltage exceeding the available voltage;
   a non-linear processing module that processes the saturation parameter to generate a processed saturation parameter; and
   a reference current modifier module that generates the first modified current command based on the processed saturation parameter.

9. The system of claim 8, wherein the saturation parameter is an inverse ratio of the commanded voltage to the limited voltage command.

10. The system of claim 1, wherein the second modified current command retains a proportion of a direct axis (d-axis) current and a quadrature axis (q-axis) current provided by the commanded voltage.

11. The system of claim 1, wherein the first modified current command comprises a d-axis correction provided by the following equation:

$$I_{dT} = (1-\gamma_d)I_{dmax} + \gamma_d I_{dR}$$

where $I_{dmax}$ is a maximum value of the d-axis current.

12. The system of claim 1, wherein the first modified current command comprises a q-axis correction provided by the following equation:

$$I_{qT} = \gamma_q I_{qR}.$$

13. A method for preventing controller windup in an electric motor, the method comprising:
   generating, by a first anti-windup module, a first modified current command by modifying a current command that is applied to a motor control system based on a ratio of a commanded voltage corresponding to the current command and a limited voltage command;
   generating, by a second anti-windup module, a second modified current command by modifying the first modified current command based on a difference between the commanded voltage and the limited voltage command; and
   using, by a controller, the second modified current command as input to determine a voltage to be applied across the electric motor for torque generation.

14. The method of claim 13 further comprising:
   determining the limited voltage command in response to the commanded voltage exceeding an available voltage of a motor power source, the limited voltage command being applied to the electric motor.

15. The method of claim 13, wherein the second anti-windup module uses an integrator back calculation to generate the second modified current command, the integrator back calculation comprising scaling the difference using a gain matrix $$G_{AW} = \begin{bmatrix} G_{Add} & G_{Adq} \\ G_{Aqd} & G_{Aqq} \end{bmatrix},$$

where $G_{Add}$, $G_{Adq}$, $G_{Aqd}$, and $G_{Aqq}$ are anti-windup parameters.

16. The method of claim 15, wherein the anti-windup parameters are based on cutoff frequencies for d-axis and q-axis of closed-loop current controller.

17. The method of claim 13, generating the first modified current command further comprises:
   determining a saturation parameter based on the limited voltage command, the saturation parameter indicates a magnitude of the commanded voltage exceeding the available voltage;
   processing the saturation parameter to generate a processed saturation parameter while retaining a nonlinear state; and
   generating a modified current command based on the processed saturation parameter, the modified current command is applied to the control system to improve current command tracking.

18. A system for preventing controller windup in a motor control system, the system comprising:
   a current command generator that generates a current command that is input to the motor control system based on a torque command indicative of an amount of torque to be generated using an electric motor;
   a controller that generates a commanded voltage corresponding to the current command;
   a limiting module that determines a limited voltage command in response to the commanded voltage exceeding an available voltage of a motor power source, the limited voltage command being applied to the electric motor; and
   an anti-windup module that receives the commanded voltage and the limited voltage command, the anti-windup module generates a modified current command by modifying the current command, the modification based on a difference between the commanded voltage and the limited voltage command, the anti-windup module uses an integrator back calculation to generate the modified current command, the integrator back calculation comprising scaling the difference using a gain matrix $$G_{AW} = \begin{bmatrix} G_{Add} & G_{Adq} \\ G_{Aqd} & G_{Aqq} \end{bmatrix},$$

where $G_{Add}$, $G_{Adq}$, $G_{Aqd}$, and $G_{Aqq}$ are non-zero anti-windup parameters.

19. The system of claim 18, wherein the anti-windup parameters are based on cutoff frequencies for d-axis and q-axis of closed-loop current controller.

20. The system of claim 18, wherein $G_{Aqd}$ and $G_{Adq}$ are set to zero.

* * * * *